(12) United States Patent
Wu et al.

(10) Patent No.: US 12,418,369 B2
(45) Date of Patent: Sep. 16, 2025

(54) ELECTRONIC DEVICE, WIRELESS COMMUNICATION METHOD, AND COMPUTER-READABLE STORAGE MEDIUM RELATED TO RESOURCE SELECTION WINDOW SIZE THRESHOLDS

(71) Applicant: Sony Group Corporation, Tokyo (JP)

(72) Inventors: Zhikun Wu, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 357 days.

(21) Appl. No.: 18/004,450

(22) PCT Filed: Jul. 28, 2021

(86) PCT No.: PCT/CN2021/108780
§ 371 (c)(1),
(2) Date: Jan. 6, 2023

(87) PCT Pub. No.: WO2022/028280
PCT Pub. Date: Feb. 10, 2022

(65) Prior Publication Data
US 2023/0299894 A1    Sep. 21, 2023

(30) Foreign Application Priority Data

Aug. 4, 2020 (CN) .......................... 202010771597.5

(51) Int. Cl.
H04L 1/1867    (2023.01)
(52) U.S. Cl.
CPC ............ H04L 1/187 (2013.01); H04L 1/1887 (2013.01)

(58) Field of Classification Search
CPC ..... H04W 72/02; H04W 72/12; H04W 72/20; H04W 72/1263; H04W 72/23;
(Continued)

(56) References Cited

U.S. PATENT DOCUMENTS

2020/0099476 A1    3/2020 Park
2020/0275412 A1*   8/2020 Kim ................... H04B 7/06954
(Continued)

FOREIGN PATENT DOCUMENTS

CN    107682930 A    2/2018
CN    109417777 A    3/2019
(Continued)

OTHER PUBLICATIONS

International Search Report and Written Opinion mailed on Nov. 3, 2021, received for PCT Application No. PCT/CN2021/108780, filed on Jul. 28, 2021, 9 pages including English Translation.

*Primary Examiner* — Peter Chen
(74) *Attorney, Agent, or Firm* — XSENSUS LLP

(57) ABSTRACT

The present disclosure relates to an electronic device, a wireless communication method and a computer-readable storage medium. The electronic device of the present disclosure comprises a processing circuit, which is configured to: discontinuously sense, in a time domain, whether a resource in a resource pool is idle; and according to a sensing result, determine a resource for a transmission process of a hybrid automatic repeat request (HARQ), the transmission process comprising an initial transmission process and a retransmission process. By using the electronic device, wireless communication method and computer-readable storage medium of the present disclosure, a user equipment can support both partial sensing and HARQ techniques.

13 Claims, 9 Drawing Sheets

(58) Field of Classification Search
CPC ....... H04W 4/40; H04W 76/28; H04W 40/12; H04L 1/18; H04L 1/1867; H04L 1/187; H04L 1/1887; H04L 1/189; H04L 1/1896; H04L 1/1812; H04L 1/1816; H04L 1/1819; H04L 1/1822; H04L 1/1825; H04L 5/0055

See application file for complete search history.

(56) References Cited

U.S. PATENT DOCUMENTS

| | | | |
|---|---|---|---|
| 2022/0216956 A1* | 7/2022 | Yoshioka | H04W 72/0446 |
| 2023/0199728 A1* | 6/2023 | Yoshioka | H04W 76/14 370/329 |

FOREIGN PATENT DOCUMENTS

| | | | |
|---|---|---|---|
| CN | 111213393 A | 5/2020 | |
| CN | 111226487 A | 6/2020 | |
| WO | 2019/066629 A1 | 4/2019 | |

* cited by examiner

ELECTRONIC DEVICE, WIRELESS COMMUNICATION METHOD, AND COMPUTER-READABLE STORAGE MEDIUM RELATED TO RESOURCE SELECTION WINDOW SIZE THRESHOLDS

CROSS-REFERENCE TO RELATED APPLICATIONS

This application is based on PCT filing PCT/CN2021/108780, filed on Jul. 28, 2021, which claims priority to Chinese Patent Application No. 202010771597.5, titled "ELECTRONIC DEVICE, WIRELESS COMMUNICATION METHOD, AND COMPUTER-READABLE STORAGE MEDIUM", filed on Aug. 4, 2020, with the China National Intellectual Property Administration, each of which is incorporated herein by reference in its entirety.

FIELD

Embodiments of the present disclosure generally relate to the field of wireless communication, and in particular to an electronic device, a wireless communication method, and computer-readable storage medium. More specifically, the present disclosure relates to an electronic device as a user equipment in a wireless communication system, a wireless communication method performed by a user equipment in a wireless communication system, and a computer-readable storage medium.

BACKGROUND

In the D2D (Device-to-Device) communication process, a user equipment as a sending end may directly communicate with a user equipment as a receiving end through a Side-Link. In a case that a resource selection mode is mode 2, the user equipment as the sending end may determine a resource used for sending information to the user equipment as the receiving end.

Partial sensing technology means that the user equipment discontinuously senses a resource or channel in time domain, thereby saving the power consumption of the user equipment. That is, In a case that the resource selection method is mode 2, the user equipment supporting partial sensing may discontinuously sense the resource or channel in time domain, and select the resources sending information to the user equipment as the receiving end based on a result of the sensing process.

Hybrid Automatic Repeat Request (HARQ) technology is formed by combining a forward error correction (FEC) technology with an automatic repeat request (ARQ) technology. In a case of decoding failure, the receiver may save received data and request a sender to re-transmit data, and merges the re-transmitted data with the previously received data before decoding. In this way, a diversity gain may be formed, thereby reducing the number of times of re-transmissions and reducing a delay.

In the conventional technology, it has not been studied how to support HARQ technology for a user equipment that supports partial sensing. Therefore, it is necessary to propose a technical solution to make it possible for user equipment to support both partial sensing and HARQ technologies.

SUMMARY

This summary section provides a general summary of the present disclosure, rather than a comprehensive disclosure of its full scope or its features.

An objective of the present disclosure is to provide an electronic device, a wireless communication method and a computer-readable storage medium, so that a user equipment may support both partial sensing and HARQ technologies.

According to an aspect of the present disclosure, an electronic device including processing circuitry is provided. The processing circuitry is configured to: discontinuously sense, in time domain, whether a resource in a resource pool is idle; and determine, based on a result of the sensing, a resource used for a transmission process of Hybrid Automatic Repeat Request HARQ, the transmission process including an initial transmission process and a re-transmission process.

According to another aspect of the present disclosure, a wireless communication method is provided. The wireless communication method includes: discontinuously sensing, in time domain, whether a resource in a resource pool is idle; and determining, based on a result of the sensing, a resource used for a transmission process of Hybrid Automatic Repeat Request HARQ, the transmission process including an initial transmission process and a re-transmission process.

According to another aspect of the present disclosure, a computer-readable storage medium including executable computer instructions is provided. The executable computer instructions, when executed by a computer, cause the computer to perform the wireless communication method according to the present disclosure.

According to another aspect of the present disclosure, a computer program is provided. The computer program, when executed by a computer, causes the computer to perform the wireless communication method according to the present disclosure.

With the electronic device, the wireless communication method, and the computer-readable storage medium according the present disclosure, the electronic device may discontinuously sense a resource in a resource pool in time domain, and may determine a resource used for a transmission process of HARQ based on a sensing result. In this way, the electronic device may support both partial sensing and HARQ.

Further areas of applicability will become apparent from the description provided herein. The description and specific examples in this summary are for illustrative purposes only, and are not intended to limit the scope of the present disclosure.

BRIEF DESCRIPTION OF THE DRAWINGS

The drawings are described herein only for illustrating the selected embodiments rather than all possible embodiments, and are not intended to limit the scope of the present disclosure. In the drawings.

Figure 1:
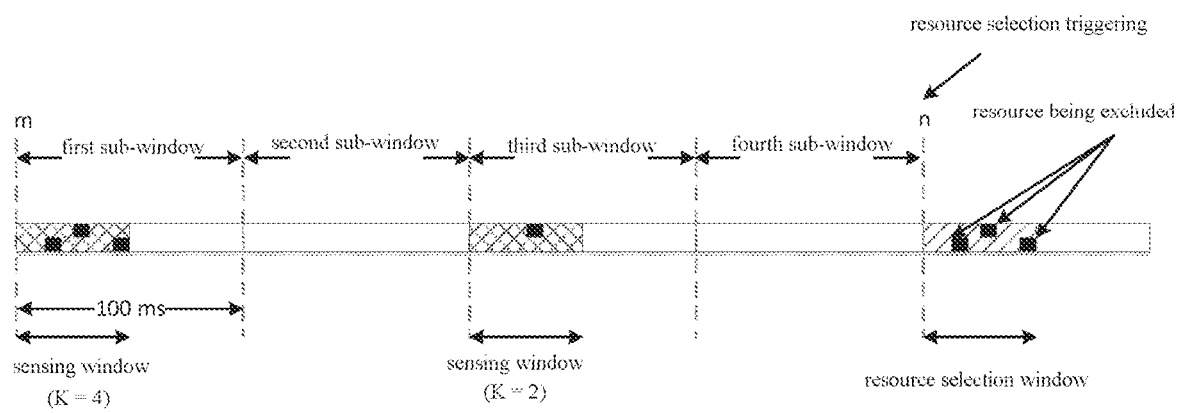
FIG. 1 is a schematic diagram showing a process of discontinuous sensing in time domain.

Although various modification and alternations are easily made onto the present disclosure, the specific embodiments are shown in the drawings as an example, and are described in detail here. It should be understood that description for the specific embodiments is not intended to limit the present disclosure into a disclosed specific form, and the present disclosure aims to cover all modification, equivalents and alternations within the spirit and scope of the present disclosure. It is noted that throughout the several figures, corresponding reference numerals indicate corresponding components.

DETAILED DESCRIPTION

Examples of the present disclosure are fully disclosed with reference to the drawings. The following description is merely exemplary and is not intended to limit the present disclosure and an application or use thereof.

Exemplary embodiments are provided, so that the present disclosure becomes thorough and fully convey the scope thereof to those skilled in the art. Examples of specific components, apparatus, methods and other specific details are set forth to provide detailed understanding of embodiments of the present disclosure. It will be apparent to those skilled in the art that exemplary embodiments may be implemented in many different forms without the use of specific details, and they should not be construed as limiting the scope of the present disclosure. In some exemplary embodiments, well-known processes, structures and technologies are not described in detail.

Description is made in the following order:
1. Summary
2. Configuration examples of user equipment >
3. Method Embodiment
4. Exemplary applications 1. Summary FIG. 1 is a schematic diagram showing a process of discontinuous sensing in time domain.

As shown in FIG. 1, n represents the time when resource selection is triggered, that is, the time when a user equipment sends information to other user equipment. A network side device serving the user equipment, such as a base station device, may divide the time before time n (starting from time m) into multiple sub-windows in a unit of 100 ms, and configure a sub-window for partial sensing for the user equipment. In FIG. 1, it is assumed that the network side device configures a first sub-window and a third sub-window for partial sensing for the user equipment.

Further, based on the configuration by the network side device, the user equipment may determine the time for partial sensing in the sub-window. In the present disclosure, the time used for partial sensing in the sub-window may be referred to as a sensing window, that is, a sensing window shown by a grid area in FIG. 1.

The user equipment senses resources in a resource pool in sensing windows of the first sub-window and the third sub-window, that is, senses a use state of the resources. The use state of the resources may include, for example, an idle state and an occupied state. As shown in FIG. 1, in the sensing window (k=4) of the first sub-window, the user equipment senses that three resources (black solid areas) are occupied and other resources are idle. In the sensing window (k=2) of the third sub-window, the user equipment senses that one resource (black solid area) is occupied, the one occupied resource being the same resource as one of the three occupied resources sensed in the sensing window of the first sub-window, and other resources are idle.

Further, the user equipment may determine a resource selection window (as shown in the slash area in FIG. 1) after a resource selection triggering time n. The user equipment may select resources to be used for sending information from the resources sensed as an idle state in the resource selection window, based on a result of the sensing.

As described above, the user equipment may perform a partial sensing process, that is, discontinuously sense the resources in the resource pool in time domain. Generally speaking, the period for the user equipment to send information is an integral multiple of 100 ms. Therefore, the user equipment may sense at an integer multiple of 100 ms from the time of sending information. If the resources are sensed to be in an idle state, it may be considered that the resources are in an idle state at the time of sending information. If the resource are sensed to be in an occupied state, it may be considered that the resources are in an occupied state at the time of sending information. In this way, it is possible to save the power consumption of the user equipment while effectively sensing the occupancy of resources.

In the existing research, how the user equipment supporting partial sensing supports HARQ technology has not been discussed. Therefore, the present disclosure proposes an electronic device in a wireless communication system, a wireless communication method performed by the electronic device in the wireless communication system, and a computer-readable storage medium for such a scenario, so that the user equipment may simultaneously support partial sensing and HARQ technologies.

In the present disclosure, a sensing window refers to a time window in which the user equipment performs partial sensing, and a resource selection window refers to a time window in which the user equipment selects a resource for sending information based on a result of a partial sensing.

The wireless communication system according to the present disclosure may be a 5G NR (New Radio) communication system.

The electronic device according to the present disclosure may be used as ta user equipment in the wireless communication system, and the electronic device according to the present disclosure may perform D2D transmission with other user equipment in the wireless communication system. More specifically, the electronic device according to the present disclosure may be a transmitting end device for D2D transmission.

The user equipment according to the present disclosure may be a mobile terminal (such as a smartphone, a tablet personal computer (PC), a notebook PC, a portable game terminal, a portable/dongle mobile router, and a digital camera) or a vehicle terminal (such as a vehicle navigation device). The user equipment may also be implemented as a terminal performing machine to machine (M2M) communication (or a machine-type communication (MTC) terminal). In addition, the user equipment may be a wireless communication module (such as an integrated circuit module including a single wafer) installed on each of the terminals described above).

2. Configuration Example of User Equipment

Figure 2:
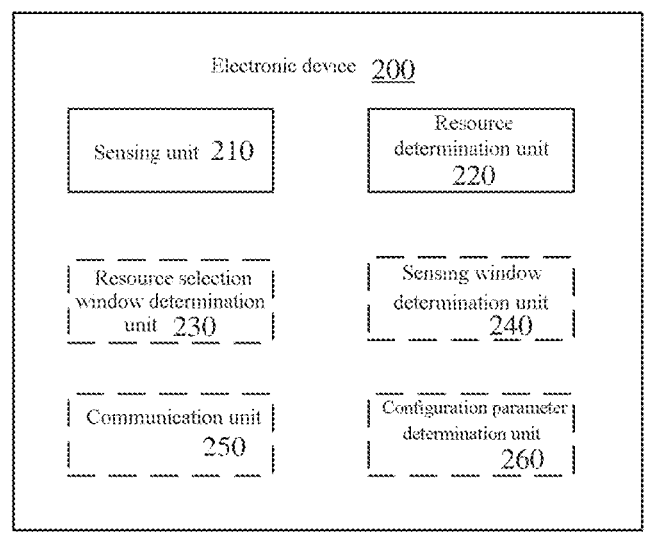
FIG. 2 is a block diagram showing an example of a configuration of an electronic device according to an embodiment of the present disclosure.

FIG. 2 is a block diagram showing a structure of an electronic device 200 used as a user equipment in a wireless communication system according to an embodiment of the present disclosure.

As shown in FIG. 2, the electronic device 200 may include a sensing unit 210 and a resource determination unit 220.

Here, each unit of the electronic device 200 may be included in a processing circuitry. It should be noted that the electronic device 200 may include one or more processing circuitries. Further, the processing circuitry may include various discrete functional units for performing various different functions and/or operations. It should be noted that these functional units may be physical entities or logical entities, and units having different names may be implemented by the same physical entity.

According to an embodiment of the present disclosure, the sensing unit 210 may discontinuously sense whether resources in a resource pool are idle in time domain or not.

According to an embodiment of the present disclosure, the resource determination unit 220 may determine a resource used for a transmission process of HARQ based on a result sensed by the sensing unit 210, and the transmission process includes an initial transmission process and a re-transmission process.

As described above, according to an embodiment of the present disclosure, the electronic device 200 may discontinuously sense a resource in a resource pool in time domain, and may determine a resource used for a transmission process of HARQ based on a result of the sensing. In this way, the electronic device 200 may support both partial sensing and HARQ.

According to an embodiment of the present disclosure, the sensing unit 210 may sense channel resources in a resource pool that are configured to support sensing. For example, when all channel resources in the resource pool support sensing, the sensing unit 210 may sense all channel resources in the resource pool. For another example, when some of all channel resources in the resource pool are configured to support sensing and the rest are configured to support random selection, the sensing unit 210 may sense some channel resources in the resource pool that are configured to support sensing.

According to an embodiment of the present disclosure, the sensing unit 210 may sense channel resources in the resource pool within time periods of multiple sensing windows in time domain, and the sensing windows in time domain are discontinuous. That is, there is a domain interval between any two sensing windows.

According to an embodiment of the present disclosure, the sensing unit 210 may sense a use state of the channel resources, and the use state may include an idle state and an occupied state. In addition, the sensing unit 210 may sense the use state of the channel resources according to any sensing method, which is not limited in the present disclosure.

According to an embodiment of the present disclosure, the resource determination unit 220 may determine a resource used for a transmission process of HARQ based on a result sensed by the sensing unit 210. Specifically, the resource determination unit 220 may determine a resource used for a transmission process of HARQ based on resources sensed as idle. That is, when determining the resource used for the transmission process of HARQ, the resource determination unit 220 may exclude resources sensed as occupied.

According to an embodiment of the present disclosure, as shown in FIG. 2, the electronic device 200 may further include a resource selection window determination unit 230 for determining one or more resource selection windows in time domain. Here, the resource selection window is a window that is located after a resource selection triggering in time domain for selecting resources sending information to a user equipment at a receiving end.

According to an embodiment of the present disclosure, the maximum number of resource selection windows may be configured for the electronic device 200 by a network side device serving the electronic device 200, such as a base station device. Further, the resource selection window determination unit 230 may determine the sizes of resource selection windows, and determine locations of the resource selection windows in time domain based on the configuration of the maximum number of resource selection windows by the network side device and the resource selection triggering time n.

According to an embodiment of the present disclosure, the network side device may configure one resource selection window for the electronic device 200, or configure multiple resource selection windows for the electronic device 200. For example, FIG. 1 shows an example of one resource selection window.

Figure 3:
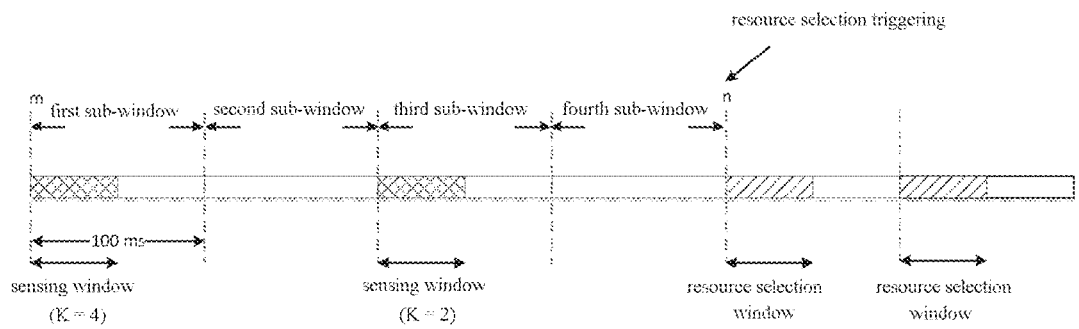
FIG. 3 is a schematic diagram showing the process of discontinuous sensing in time domain in a case that multiple resource selection windows are configured according to an embodiment of the present disclosure.

FIG. 3 is a schematic diagram showing the process of discontinuous sensing in time domain in a case that multiple resource selection windows are configured according to an embodiment of the present disclosure. As shown in FIG. 3, the electronic device 200 is configured with two resource selection windows.

According to an embodiment of the present disclosure, the resource selection window determination unit 230 may determine the size of one or more resource selection windows based on a threshold K of number of times of the transmission process. Further, in a case that the electronic device 200 is configured with one resource selection window, the resource selection window determination unit 230 may determine the size of the resource selection window based on the threshold K of number of times of the transmission process. In a case that the electronic device 200 is configured with multiple resource selection windows, the resource selection window determination unit 230 may determine that each of the multiple resource selection windows has the same size, and determine the size of the resource selection windows based on the threshold K of number of times of the transmission process.

In the present disclosure, the transmission process may include an initial transmission process and a re-transmission process. The threshold K of number of times of the transmission process represents a maximum value of the total number of the initial transmission process and the re-transmission process. For example, in a case of K=3, it means that the maximum value of the total number of the initial transmission process and the re-transmission process equals to 3. That is, the electronic device 200 may perform the initial transmission process once, and may perform re-transmission process twice at most when the user equipment at the receiving end feeds back NACK. For another example, in a case of K=5, it means that the maximum value of the total number of the initial transmission process and the re-transmission process equals to 5. That is, the electronic device 200 may perform the initial transmission process once, and may perform the re-transmission process four times at most in a case that the user equipment at the receiving end feeds back NACK.

According to an embodiment of the present disclosure, the resource selection window determination unit 230 may determine the size of the resource selection window, so that the size of the resource selection window increases as the threshold K of number of times of the transmission process increases.

According to an embodiment of the present disclosure, the resource selection window determination unit 230 may establish a mapping relationship between the threshold K of number of times of the transmission process and the size of the resource selection window, so as to determine the size of the resource selection window based on the threshold K of number of times of the transmission process.

Figure 4:
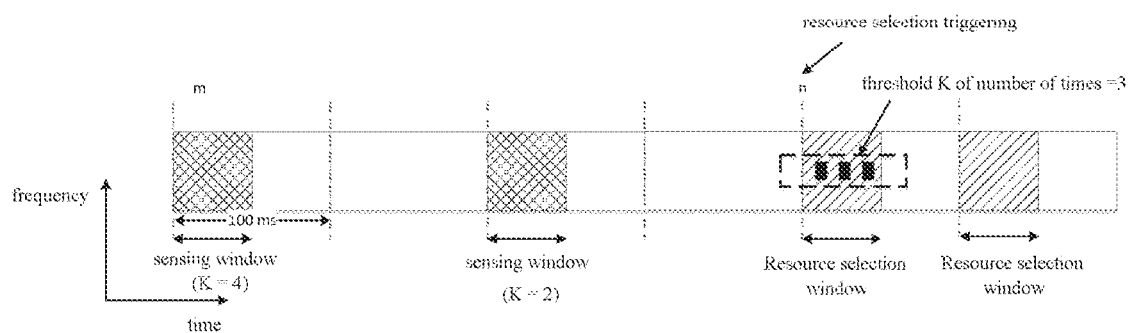
FIG. 4 is a schematic diagram showing an example of determining the size of a resource selection window based on a threshold K of number of times of a transmission process according to an embodiment of the present disclosure.
Figure 5:
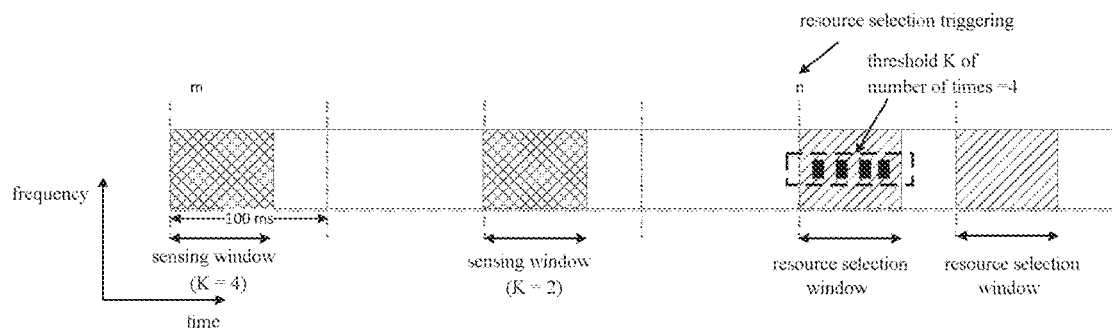
FIG. 5 is a schematic diagram showing an example of determining the size of a resource selection window based on a threshold K of number of times of a transmission process according to an embodiment of the present disclosure.
Figure 6:
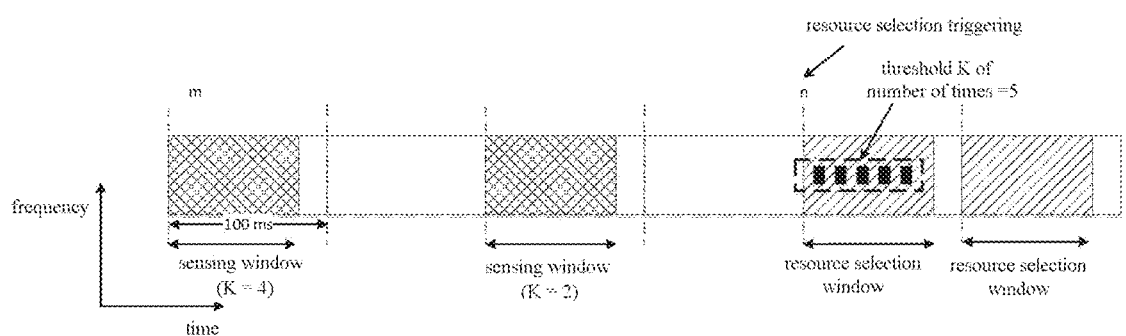
FIG. 6 is a schematic diagram showing an example of determining the size of a resource selection window based on a threshold K of number of times of a transmission process according to an embodiment of the present disclosure.

FIGS. 4 to 6 are diagrams showing an example of determining the size of a resource selection window based on a threshold K of number of times of a transmission process according to an embodiment of the present disclosure. FIG. 4 shows the size of the resource selection window determined by the resource selection window determination unit 230 in a case of K=3. FIG. 5 shows the size of the resource selection window determined by the resource selection window determination unit 230 in a case of K=4. FIG. 6 shows the size of the resource selection window determined by the resource selection window determination unit 230 in a case of K=5. The black solid areas show the resources used in the initial transmission process and the re-transmission process of the HARQ process.

As shown in FIGS. 4 to 6, the size of the resource selection window in a case of K=4 is larger than the size of the resource selection window in a case of K=3, and the size of the resource selection window in a case of K=5 is larger than the size of the resource selection window in the case of K=4. That is, the size of the resource selection window increases as K increases.

It is worth noting that FIGS. 4 to 6 show an example in which the electronic device 200 is configured with two resource selection windows with the same size, but the disclosure is not limited to this.

According to an embodiment of the present disclosure, the resource selection window determination unit 230 may determine the size of one or more resource selection windows based on a priority of a transmission process. Further, in a case that the electronic device 200 is configured with one resource selection window, the resource selection window determination unit 230 may determine the size of the resource selection window based on the priority of the transmission process. In a case that the electronic device 200 is configured with multiple resource selection windows, the resource selection window determination unit 230 may determine that each of the multiple resource selection windows has the same size, and determine the size of each resource selection window based on the priority of the transmission process.

According to an embodiment of the present disclosure, the resource selection window determination unit 230 may determine the size of one or more resource selection windows, so that the size of the resource selection window increases as the priority of the transmission process increases.

According to an embodiment of the present disclosure, the resource selection window determination unit 230 may establish a mapping relationship between the priority of the transmission process and the size of the resource selection window, so as to determine the size of the resource selection window based on the priority of the transmission process.

According to an embodiment of the present disclosure, the resource selection window determination unit 230 may determine a threshold K of number of times of a transmission process based on the relationship between the priority of the transmission process and the threshold K of number of times of the transmission process, so as to determine the size of the resource selection window based on the threshold K of number of times of the transmission process. Here, the relationship between the priority of the transmission process and the threshold K of number of times of the transmission process may be configured by a network side device serving the electronic device 200, such as a base station device, so that the resource selection window determination unit 230 may determine the threshold K of number of times of the transmission process based on this relationship, and determine the size of the resource selection window based on the threshold K of number of times of the transmission process according to the method described above.

According to an embodiment of the present disclosure, the resource selection window determination unit 230 may determine that the time interval between starting positions of the resource selection windows is an integer multiple of 100 ms. For example, in FIGS. 4 to 6, the time interval between starting positions of two resource selection windows is 100 ms. Of course, the time interval between starting positions of the resource selection windows may also be 200 ms, 300 ms, 400 ms, etc. In addition, the resource selection window determination unit 230 may determine a starting position of a first resource selection window based on the resource selection triggering time n. Herein, the starting position of the first resource selection window overlapping with the resource selection triggering time n is illustrated as an example. In fact, the time interval between the starting position of the first resource selection window and the resource selection triggering time n may be determined based on the time delay of the electronic device 200 for resource selection.

In addition, since the size of the resource selection window needs to be less than or equal to 100 ms, the resource selection window determination unit 230 needs to limit the resource selection window to be within 100 ms in a case that the determined size of the resource selection window exceeds 100 ms due to a large threshold K of number of times of the transmission process. In addition, although the determined size of the resource selection window is within 100 ms, for other reasons such as improving resource utilization, the resource selection window determination unit 230 may also need to limit the size of the resource selection window.

According to an embodiment of the present disclosure, in a case that the threshold K of number of times of the transmission process is greater than or equal to a predetermined threshold value of K or the priority of the transmission process is higher than or equal to a predetermined threshold value of the priority, the resource selection window determination unit 230 may determine the size of the resource selection window as a fixed value. The fixed value may be the size of the resource selection window when K is equal to a predetermined threshold value of K. For example, in a case that the predetermined threshold value of K equals to 5, the size of the resource selection window increases as K increases when K is less than or equal to 5; the size of the resource selection window is a fixed value when K=6, 7, 8, . . . , preferably, the size of the resource selection window equals to the size of the resource selection window when K is equal to 5.

As described above, according to an embodiment of the present disclosure, the resource selection window determination unit 230 may determine the size of the resource selection window based on the threshold K of number of times of the transmission process or the priority of the transmission process. In this way, when the resource determination unit 220 determines resources used for the initial transmission process and the re-transmission process, resources used for K transmission processes may be allocated in the same resource selection window as much as possible, thereby improving the resource utilization efficiency.

According to an embodiment of the present disclosure, as shown in FIG. 2, the electronic device 200 may further include a sensing window determination unit 240 for determining the size of the sensing window to be sensed based on the size of the resource selection window.

According to an embodiment of the present disclosure, the sensing window determination unit 240 may determine multiple sub-windows for performing sensing based on the configuration by the network side device, and determine the size of the sensing window among the multiple sub-windows. In addition, the sensing window determination unit 240 may determine that each sensing window has the same size. Here, since the network side device divides the time domain before the resource selection triggering into sub-windows in a unit of 100 ms, the interval of a starting position of the sub-window for sensing in time domain is an integer multiple of 100 ms. That is, the interval between the starting positions of the sensing windows determined by the sensing window determination unit 240 in time domain is an integer multiple of 100 ms. As shown in FIGS. 3 to 6, the interval between starting positions of two sensing windows in time domain is 200 ms.

According to an embodiment of the present disclosure, the sensing window determination unit 240 may determine the size of the sensing window, so that the size of the sensing window is greater than or equal to the size of the resource selection window. Here, since the period for the electronic device 200 and other user devices to send information is an integer multiple of 100 ms, the electronic device 200 needs to sense a resource at an integer multiple of 100 ms before a resource selection window. That is, the size of the sensing window needs to be greater than or equal to the size of the resource selection window.

Figure 7:
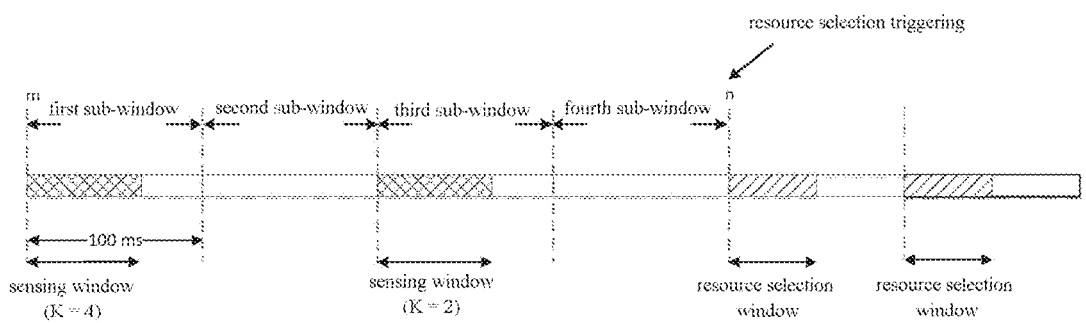
FIG. 7 is a schematic diagram showing an example of determining the size of a sensing window based on the size of a resource selection window according to an embodiment of the present disclosure.

FIGS. 3 to 6 show an example in which the size of the sensing window is equal to the size of the resource selection window. FIG. 7 is a schematic diagram showing an example of determining the size of a sensing window based on the size of a resource selection window according to another embodiment of the present disclosure. As shown in FIG. 7, the sensing window is located in a first sub-window and a third sub-window, and the size of the sensing window is larger than the size of the resource selection window.

As described above, according to an embodiment of the present disclosure, the resource selection window determination unit 230 may determine the size of the resource selection window based on the threshold K of number of times of the transmission process or the priority of the transmission process, and the sensing window determination unit 240 may determine the size of the sensing window based on the size of the resource selection window. That is, the size of the sensing window is actually determined based on the threshold K of number of times of the transmission process or the priority of the transmission process.

In the conventional HARQ process, only resources used for three transmission processes may be selected at a time. If the number of times threshold of HARQ transmission processes exceeds 3, resources need to be selected multiple times. According to an embodiment of the present disclosure, the sizes of the resource selection window and the sensing window may be determined based on the threshold K of number of times of the transmission process or the priority of the transmission process, thus greatly reducing the number of times to select resources. Furthermore, K transmission processes may be located in fewer resource selection windows as far as possible, so as to improve the utilization of resources.

According to an embodiment of the present disclosure, after the resource selection window determination unit 230 determines the resource selection window and the sensing window determination unit 240 determines the sensing window, the sensing unit 210 may sense the resources in the resource pool in the sensing window, and the resource determination unit 220 may determine the resource used for the transmission process based on the sensing result of the sensing unit 210 and the resource selection window determined by the resource selection window determination unit 230. The resource determination unit 220 will be described in detail below.

According to an embodiment of the present disclosure, the resource determination unit 220 may select resources used for K transmission processes from the resources sensed as being idle resources in one resource selection window of one or more resource selection windows determined by the resource selection window determination unit 230. That is, in one resource selection window, after resources sensed as occupied by the sensing unit 210 having been excluded, the resource determination unit 220 selects resources used for K transmission processes, and the resources used for the K transmission process are located in the same resource selection window.

Figure 8:
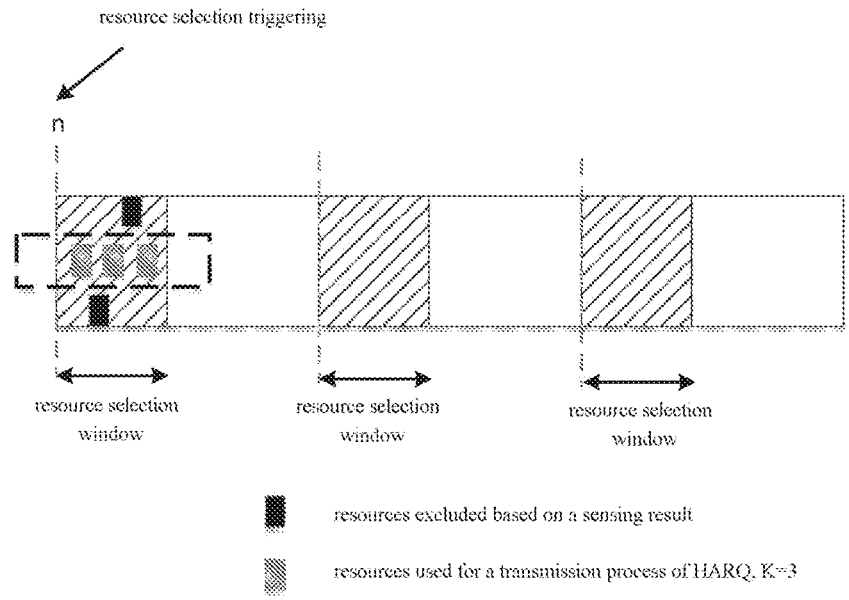
FIG. 8 is a schematic diagram showing an example of selecting resources used for K times of transmission processes in one resource selection window according to an embodiment of the present disclosure.

FIG. 8 is a schematic diagram showing an example of selecting resources used for K transmission processes in one resource selection window according to an embodiment of the present disclosure. As shown in FIG. 8, the threshold K of number of times of the transmission process equals to 3. In a first resource selection window determined by the resource selection window determination unit 230, two resources sensed as occupied by the sensing unit 210 are excluded, and the resource determination unit 220 determines the resources used for three transmission processes.

According to an embodiment of the present disclosure, the resource determination unit 220 may select resources used for K transmission processes from resources sensed as being idle resources in multiple resource selection windows of one or more resource selection windows determined by the resource selection window determination unit 230. That is, in the multiple resource selection windows, after resources sensed as occupied by the sensing unit 210 having been excluded, the resource determination unit 220 selects the resources used for the K transmission process, and the resources used for the K transmission processes are located in the multiple resource selection windows.

Figure 9:
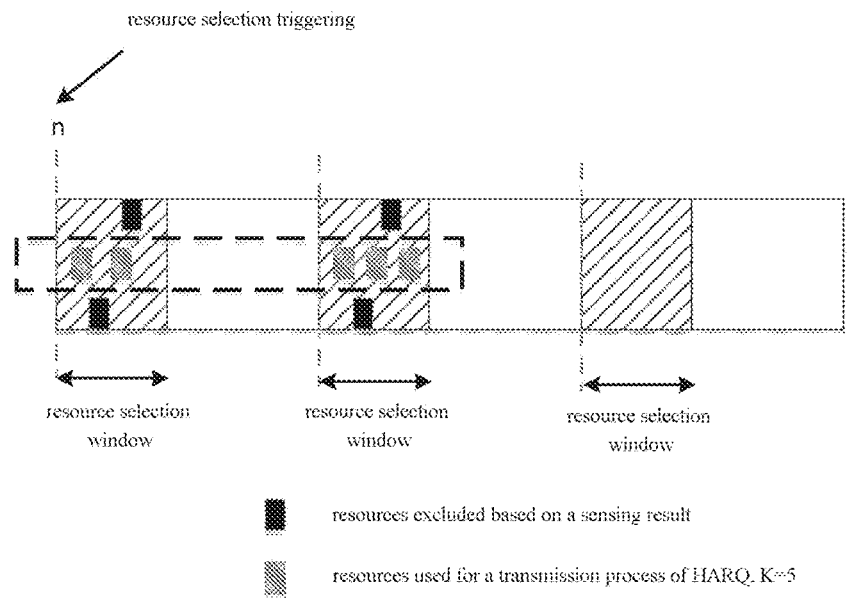
FIG. 9 is a schematic diagram showing an example of selecting resources used for K times of transmission processes in multiple resource selection windows according to an embodiment of the present disclosure.

FIG. 9 is a schematic diagram showing an example of selecting resources used for K transmission processes in multiple resource selection windows according to an embodiment of the present disclosure. As shown in FIG. 9, the threshold K of number of times of the transmission process equals to 5. In a first resource selection window determined by the resource selection window determination unit 230, two resources sensed as occupied by the sensing unit 210 are excluded, and the resource determination unit 220 determines resources used for two transmission processes. In a second resource selection window determined by the resource selection window determination unit 230, two resources sensed as occupied by the sensing unit 210 are excluded, and the resource determination unit 220 determines resources used for three transmission processes. Thus, resources used for five transmission processes are allocated in two resource selection windows.

Figure 10:
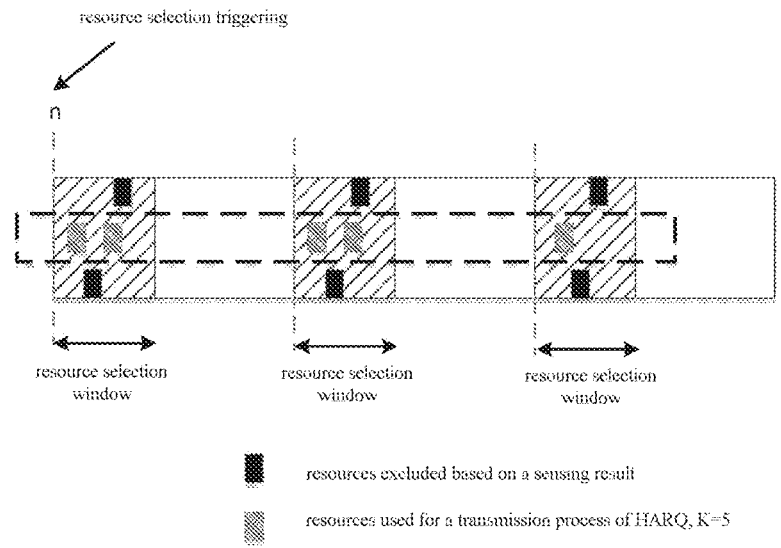
FIG. 10 is a schematic diagram showing an example of selecting resources used for K times of transmission processes in multiple resource selection windows according to an embodiment of the present disclosure.

FIG. 10 is a schematic diagram showing an example of selecting resources used for K transmission processes in multiple resource selection windows according to another embodiment of the present disclosure. As shown in FIG. 10, the threshold K of number of times of the transmission process equals to 5. In a first resource selection window determined by the resource selection window determination unit 230, two resources sensed as occupied by the sensing unit 210 are excluded, and the resource determination unit 220 determines the resources used for two transmission processes. In a second resource selection window determined by the resource selection window determination unit 230, two resources sensed as occupied by the sensing unit 210 are excluded, and the resource determination unit 220 determines the resources used for two transmission processes. In a third resource selection window determined by the resource selection window determination unit 230, two resources sensed as occupied by the sensing unit 210 are excluded, and the resource determination unit 220 determines the resources used for one transmission process. Thus, resources used for five transmission processes are allocated in three resource selection windows.

According to an embodiment of the present disclosure, the resource determination unit 220 may select resources used for partial transmission processes of K transmission processes from resources sensed as being idle resources in one resource selection window of one or more resource selection windows determined by the resource selection window determination unit 230, and determine a resource used for other transmission processes of the K transmission process from other resource pools.

That is, in one resource selection window, after resources sensed as occupied by the sensing unit 210 having been excluded, the resource determination unit 220 selects resources used for N (N is a positive integer and less than K) transmission processes of K transmission processes. The resources used for the N transmission processes are located in one resource selection window, while resources used for other (K-N) transmission processes are selected from other resource pools for randomly selecting a resource. In other words, the resources used for the N transmission processes are determined based on a sensing result of the sensing unit 210, while the resources used for the (K-N) transmission processes have not been sensed by the sensing unit 210.

Figure 11:
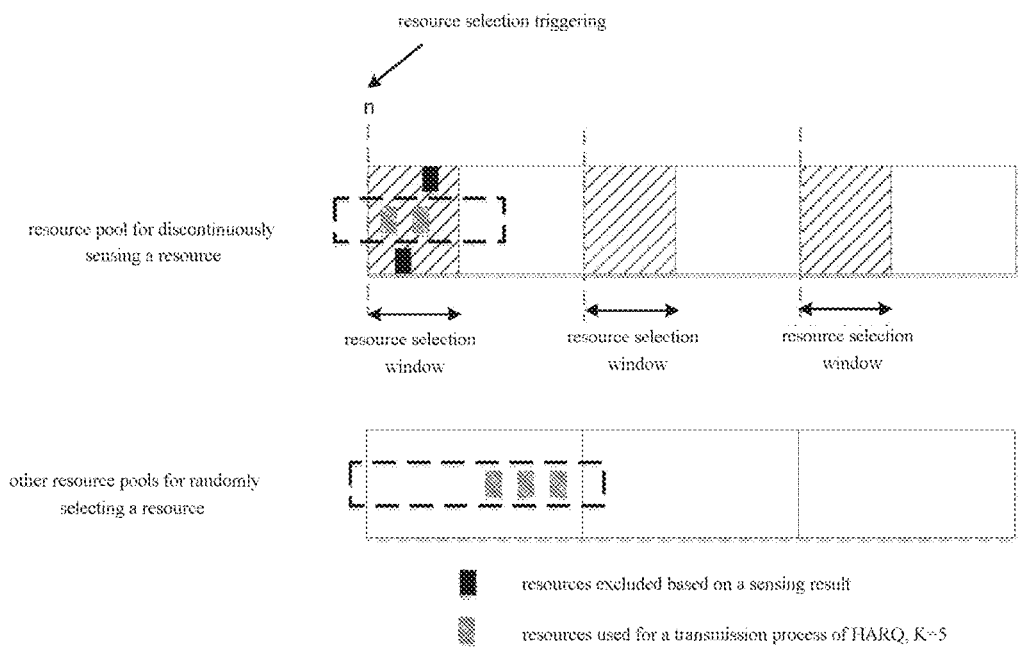
FIG. 11 is a schematic diagram showing an example of selecting resources used for partial transmission processes in one resource selection window and selecting resources used for other transmission processes from other resource pools according to an embodiment of the present disclosure.

FIG. 11 is a schematic diagram showing an example of selecting resources used for partial transmission processes in one resource selection window and selecting resources used for other transmission processes from other resource pools according to an embodiment of the present disclosure. As shown in FIG. 11, the threshold K of number of times of the transmission process equals to 5. In a first resource selection window determined by the resource selection window determination unit 230, two resources sensed as occupied by the sensing unit 210 are excluded, and the resource determination unit 220 determines resources used for two transmission processes. In other resource pools for randomly selecting a resource, the resource determination unit 220 determines resources used for three transmission processes. In FIG. 11, although the resources used for other transmission processes are separated from the resource selection window in time domain, since the resources used for other transmission processes are resources used for random selection, the resources used for other transmission processes may also overlap with the resource selection window in time domain, that is, the location of the resources used for random selection in time domain may be arbitrary.

According to an embodiment of the present disclosure, the resource determination unit 220 may select resources used for partial transmission processes of K transmission processes from resources sensed as being idle resources in multiple resource selection windows of one or more resource selection windows determined by the resource selection window determination unit 230, and determine a resource used for other transmission processes of K transmission processes from other resource pools.

That is, in multiple resource selection windows, after resources sensed as occupied by the sensing unit 210 having been excluded, the resource determination unit 220 selects resources used for N transmission processes of the K transmission process. The resources used for the N transmission processes are located in multiple resource selection windows, while resources used for other (K-N) transmission processes are selected in other resource pools for randomly selecting a resource. In other words, the resources used for the N transmission processes are determined based on a sensing result of the sensing unit 210, while the resources used for the (K−N) transmission processes have not been sensed by the sensing unit 210.

Figure 12:
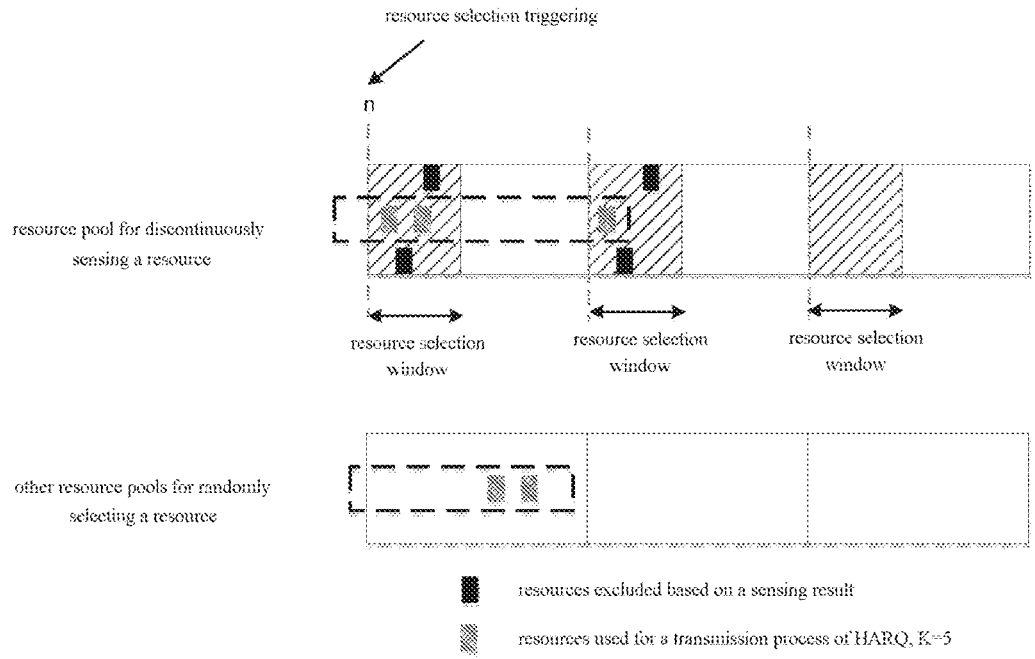
FIG. 12 is a schematic diagram showing an example of selecting resources used for partial transmission processes in multiple resource selection windows and selecting resources used for other transmission processes from other resource pools according to an embodiment of the present disclosure.

FIG. 12 is a schematic diagram showing an example of selecting resources used for partial transmission processes in multiple resource selection windows and selecting resources used for other transmission processes from other resource pools according to an embodiment of the present disclosure. As shown in FIG. 12, the threshold K of number of times of the transmission process equals to 5. In a first resource selection window determined by the resource selection window determination unit 230, two resources sensed as occupied by the sensing unit 210 are excluded, and the resource determination unit 220 determines the resources used for two transmission process. In other resource pools for randomly selecting a resource, the resource determination unit 220 determines resources used for two transmission processes. In a second resource selection window determined by the resource selection window determination unit 230, two resources sensed as occupied by the sensing unit 210 are excluded, and the resource determination unit 220 determines resources used for one transmission process. In FIG. 12, although the resources used for other transmission processes are separated from the two resource selection windows in time domain, since the resources used for other transmission processes are resources used for random selection, the resources used for other transmission processes may also overlap with any resource selection window in time domain, that is, the location of the resources used for random selection in time domain may be arbitrary.

Here, the network side device may configure parameters of each of resource pools, including whether the resource pool supports sensing. In a case that the resource pool supports sensing, the user equipment may use resources in the resource pool through sensing. In a case that the resource pool does not support sensing, that is, it supports random selection, the user equipment may randomly select a resource in the resource pool without a sensing process. In addition, the network side device may also configure parameters in a unit of channel resources in the resource pool. For example, some channel resources in the resource pool support sensing, and some channel resources support random selection. In the aforementioned embodiment, if all channel resources in the current resource pool support sensing, the sensing unit 210 senses all channel resources in the resource pool, and the resource determination unit 220 may determine a resource used for other transmission processes from other resource pools supporting random selection. If some channel resources in the current resource pool support sensing, the sensing unit 210 senses the channel resources supporting sensing in the resource pool, and the resource determination unit 220 may determine a resource used for other transmission processes from the channel resources supporting random selection in the current resource pool, or determine a resource used for other transmission processes from other resource pools supporting random selection.

In addition, for a transmission process performed with randomly selected resource, the electronic device 200 needs to perform a blind transmission process, that is, a transmission process without ACK/NACK feedback.

According to an embodiment of the present disclosure, the resource determination unit 220 may select resources used for partial transmission processes of the K transmission processes from resources sensed as being idle resources in one resource selection window of one or more resource selection windows determined by the resource selection window determination unit 230, and the electronic device 200 does not transmit other transmission processes of the K transmission processes.

That is to say, in a resource selection window, after resources sensed as occupied by the sensing unit 210 having been excluded, the resource determination unit 220 selects resources used for N transmission processes of the K transmission processes, and the resources used for the N transmission processes are located in one resource selection window, while other (K−N) transmission processes are discarded. In other words, after N transmission processes, if the user equipment at the receiving end still feeds back NACK, the electronic device 200 will no longer perform the re-transmission process.

Figure 13:
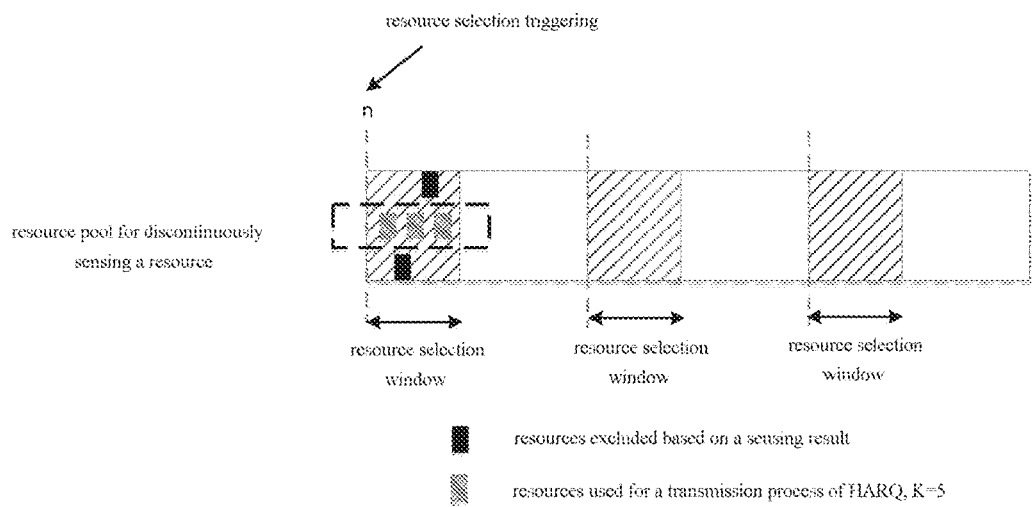
FIG. 13 is a schematic diagram showing an example of selecting resources used for partial transmission processes in one resource selection window and discarding other transmission processes according to an embodiment of the present disclosure.

FIG. 13 is a schematic diagram showing an example of selecting resources used for partial transmission processes in one resource selection window and discarding other transmission processes according to an embodiment of the present disclosure. As shown in FIG. 13, the threshold K of number of times of the transmission process equals to 5. In a first resource selection window determined by the resource selection window determination unit 230, two resources sensed as occupied by the sensing unit 210 are excluded, and the resource determination unit 220 determines resources used for three transmission processes. The resource determination unit 220 no longer determines resources used for the other two transmission processes.

According to an embodiment of the present disclosure, the resource determination unit 220 may select resources used for partial transmission processes of K transmission process from resources sensed as being idle resources in multiple resource selection windows of one or more resource selection windows determined by the resource selection window determination unit 230, and the electronic device 200 does not transmit other transmission processes of the K transmission processes.

That is, in the multiple resource selection windows, after the resources sensed as occupied by the sensing unit 210 having been excluded, the resource determination unit 220 selects resources used for N transmission processes of K transmission processes. The resources used for the N transmission processes are located in multiple resource selection windows, while other (K−N) transmission processes are discarded. In other words, after N transmission processes, if the user equipment at the receiving end still feeds back NACK, that is, the electronic device 200 will no longer perform the re-transmission process.

Figure 14:
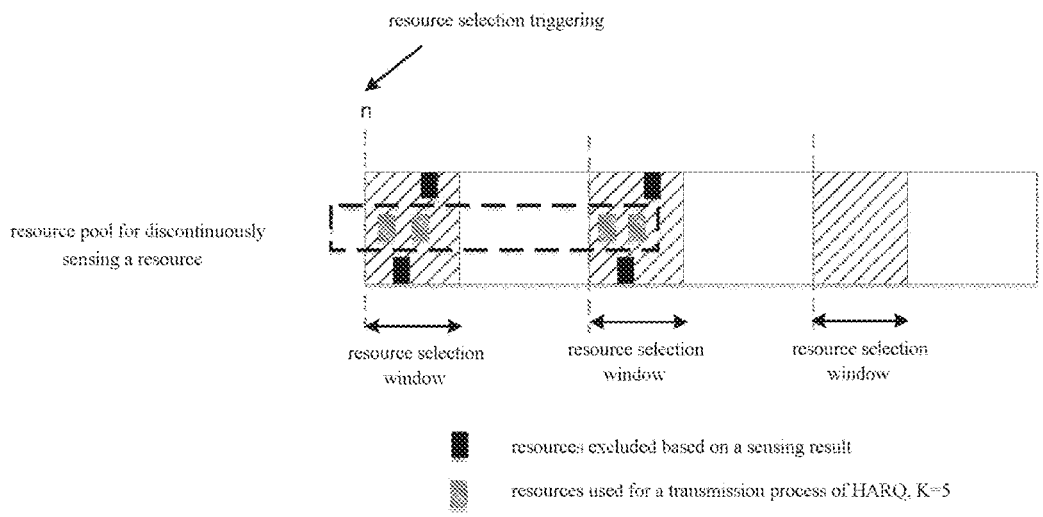
FIG. 14 is a schematic diagram showing an example of selecting resources used for partial transmission processes in multiple resource selection windows and discarding other transmission processes according to an embodiment of the present disclosure.

FIG. 14 is a schematic diagram showing an example of selecting resources used for partial transmission processes in multiple resource selection windows and discarding other transmission processes according to an embodiment of the present disclosure. As shown in FIG. 14, the threshold K of number of times of the transmission process equals to 5. In a first resource selection window determined by the resource selection window determination unit 230, two resources sensed as occupied by the sensing unit 210 are excluded, and the resource determination unit 220 determines resources used for two transmission processes. In a second resource selection window determined by the resource selection window determination unit 230, two resources sensed as occupied by the sensing unit 210 are excluded, and the resource determination unit 220 determines resources used for two transmission processes. The resource determination unit 220 no longer determines resources used for the other one transmission process.

According to an embodiment of the present disclosure, the resource determination unit 220 may determine a selection strategy to determine a resource used for each transmission process. For example, the resource determination unit 220 preferentially allocates the resources used for the K transmission processes in the same resource selection window. In a case that the resources used for the K transmission processes cannot be selected in the same resource selection window, the resource determination unit 220 may select resources used for partial transmission processes in one resource selection window, and allocate resources used for other transmission processes in other resource selection windows. For another example, In a case that the resource determination unit 220 may only select resources used for partial transmission process in the same resource selection window and the next resource selection window has not yet arrived, the resource determination unit 220 may select resources used for other transmission processes in a resource pool supporting random selection of resources. For another example, In a case that the resource determination unit 220 may only select resources used for partial transmission processes in the same or multiple resource selection windows and there is a resource shortage for random selection, the resource determination unit 220 may discard part of the transmission processes and only determine a resource used for partial transmission process of the K transmission processes.

As described above, according to an embodiment of the present disclosure, the resource determination unit 220 may determine whether to determine the resources used for all of the K transmission processes or to determine a resource used for partial transmission processes of the K transmission process. In a case of determining the resources used for partial transmission process of the K transmission processes, the resource determination unit 220 may select the resources used for the partial transmission processes in one or more resource selection windows, and discard the rest of the transmission processes. In a case of determining the resources used for all of the K transmission processes, the resource determination unit 220 may further determine whether to determine the resources used for all transmission processes through a sensing result of the sensing unit 210, or to determine the resources used for partial transmission processes through the sensing result of the sensing unit 210 and randomly select the resource used for the rest of the transmission processes. In a case of determining resources used for all transmission processes through the sensing result of the sensing unit 210, the resource determination unit 220 may select resources used for all transmission processes in one or more resource selection windows. In a case of determining the resources used for the partial transmission process through the sensing result of the sensing unit 210 and randomly selecting the resource used for the rest of the transmission processes, the resource determination unit 220 may select the resources used for partial transmission processes in one or more resource selection windows.

According to an embodiment of the present disclosure, as shown in FIG. 2, the electronic device 200 may further include a communication unit 250 for performing a communication process with other devices. For example, the electronic device 200 may receive position information of the sub-window where the sensing window is located, maximum number information of the resource selection window, and/or a relationship between a priority of the transmission process and a threshold K of number of times of the transmission process from the network side device through the communication unit 250.

According to an embodiment of the present disclosure, the electronic device 200 may further receive instruction information from the network side device through the communication unit 250.

According to an embodiment of the present disclosure, as shown in FIG. 2, the electronic device 200 may further include a configuration parameter determination unit 260 for determining configuration parameters of resource pools based on the instruction information of the network side device. For example, the electronic device 200 may determine the configuration parameters of the resource pools through the instruction information broadcasted by the network side device.

According to an embodiment of the present disclosure, configuration parameters of a resource pool may include whether the resource pool supports partial sensing and HARQ, that is, whether the resource pool allows to determine a resource used for a transmission process of HARQ based on a sensing result obtained by discontinuously sensing whether the resources in the resource pool are idle in time domain. That is, in a case that the resource pool supports partial sensing and HARQ, the electronic device 200 may determine the resources used for the transmission process of HARQ based on the sensing result as described above.

According to an embodiment of the present disclosure, in a case that the resource determination unit 220 determines the resources used for the transmission process of HARQ, the electronic device 200 may send information to the user equipment at the receiving end via a direct link based on the resources determined by the resource determination unit 220. This part will not be detailed in the present disclosure.

As described above, according to an embodiment of the present disclosure, the electronic device 200 may discontinuously sense a resource in a resource pool in time domain, and may determine a resource used for the transmission process of HARQ based on the sensing result. Further, the electronic device 200 may determine a size of the resource selection window based on a threshold K of number of times of the transmission process or a priority of the transmission process, and may determine a size of a sensing window based on the size of the resource selection window. In addition, the electronic device 200 may determine a resource used for each transmission process based on a sensing result of the sensing unit 210 and a resource selection time window. In this way, the electronic device 200 may support both partial sensing and HARQ.

3. Method Embodiment

Next, a wireless communication method performed by an electronic device 200 as user equipment in a wireless communication system according to an embodiment of the present disclosure is described in detail.

Figure 15:
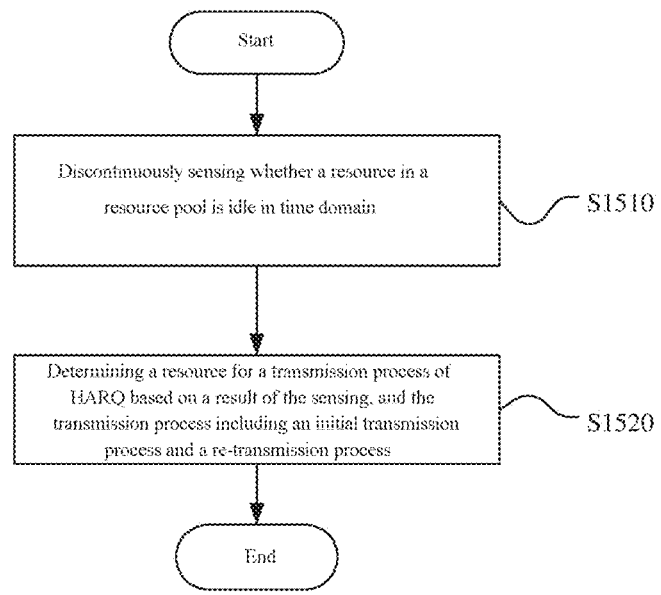
FIG. 15 is a flowchart showing a wireless communication method performed by an electronic device according to an embodiment of the present disclosure.

FIG. 15 is a flowchart showing a wireless communication method performed by an electronic device 200 as user equipment in a wireless communication system according to an embodiment of the present disclosure.

As shown in FIG. 15, in step S1510, whether resources in a resource pool are idle is sensed discontinuously in time domain.

Next, in step S1520, a resource for a transmission process of HARQ is determined based on a result of the sensing, and the transmission process includes an initial transmission process and a re-transmission process.

Preferably, the wireless communication method further includes: determining one or more resource selection windows in time domain; and determining a resource used for the transmission process based on the determined one or more resource selection windows and the result of the sensing.

Preferably, determining one or more resource selection windows includes determining a size of the one or more resource selection windows based on a threshold K of number of times of the transmission process or based on a priority of the transmission process.

Preferably, determining a size of one or more resource selection windows includes: the size of the one or more resource selection windows increases as the threshold K of number of times of the transmission process increases, or the size of the one or more resource selection windows increases as the priority of the transmission process increases.

Preferably, the wireless communication method further includes: determining, based on the size of the one or more resource selection windows, a size of a sensing window for performing the sensing.

Preferably, determining a size of a sensing window includes: the size of the sensing window is greater than or equal to the size of the resource selection window.

Preferably, determining a resource used for the transmission process includes: selecting, in one resource selection window of the one or more resource selection windows, resources used for K transmission processes from resources sensed as being idle resources, where K represents the number of times threshold of the transmission process.

Preferably, determining a resource used for the transmission process includes: selecting, in multiple resource selection windows of the one or more resource selection windows, resources used for K transmission processes from resources sensed as being idle resources, where K represents the number of times threshold of the transmission process.

Preferably, determining a resource used for the transmission process includes: selecting, in one resource selection window of the one or more resource selection windows or multiple resource selection windows of the one or more resource selection windows, resources used for partial transmission processes of K transmission processes from resources sensed as being idle resources, where K represents the number of times threshold of the transmission process; and determining resources from other resource pools for other transmission processes of the K times of transmission processes.

Preferably, determining a resource used for the transmission process includes: selecting, in one resource selection window of the one or more resource selection windows or multiple resource selection windows of the one or more resource selection windows, resources used for partial transmission processes of K transmission processes from resources sensed as being idle resources, where K represents the number of times threshold of the transmission process; and not transmitting other transmission processes of the K times of transmission processes.

Preferably, the wireless communication method further includes: receiving instruction information from a network side device; and determining, based on the instruction information, whether the resource pool allows to determining resources used for the transmission process of HARQ based on a sensing result obtained by discontinuously sensing whether resources in the resource pool are idle in time domain.

According to embodiments of the present disclosure, the subject performing the above method may be the electronic device 200 according to embodiments of the present disclosure, and thus all of the embodiments described above with respect to the electronic device 200 are applicable thereto.

4. Application Example

The technology of the present disclosure may be applied to various products. For example, the user equipment may be implemented as a mobile terminal such as a smartphone, a tablet personal computer (PC), a notebook PC, a portable game terminal, a portable/dongle type mobile router, and a digital camera, or a vehicle terminal such as a vehicle navigation apparatus served by the base station. The user equipment may also be implemented as a terminal performing machine to machine (M2M) communication (also referred to as a machine-type communication (MTC) terminal). In addition, the user equipment may further be a wireless communication module (such as an integrated circuitry module including one wafer) mounted on each of the above user equipment.

<Application Example Regarding Terminal Device>

First Application Example

Figure 16:
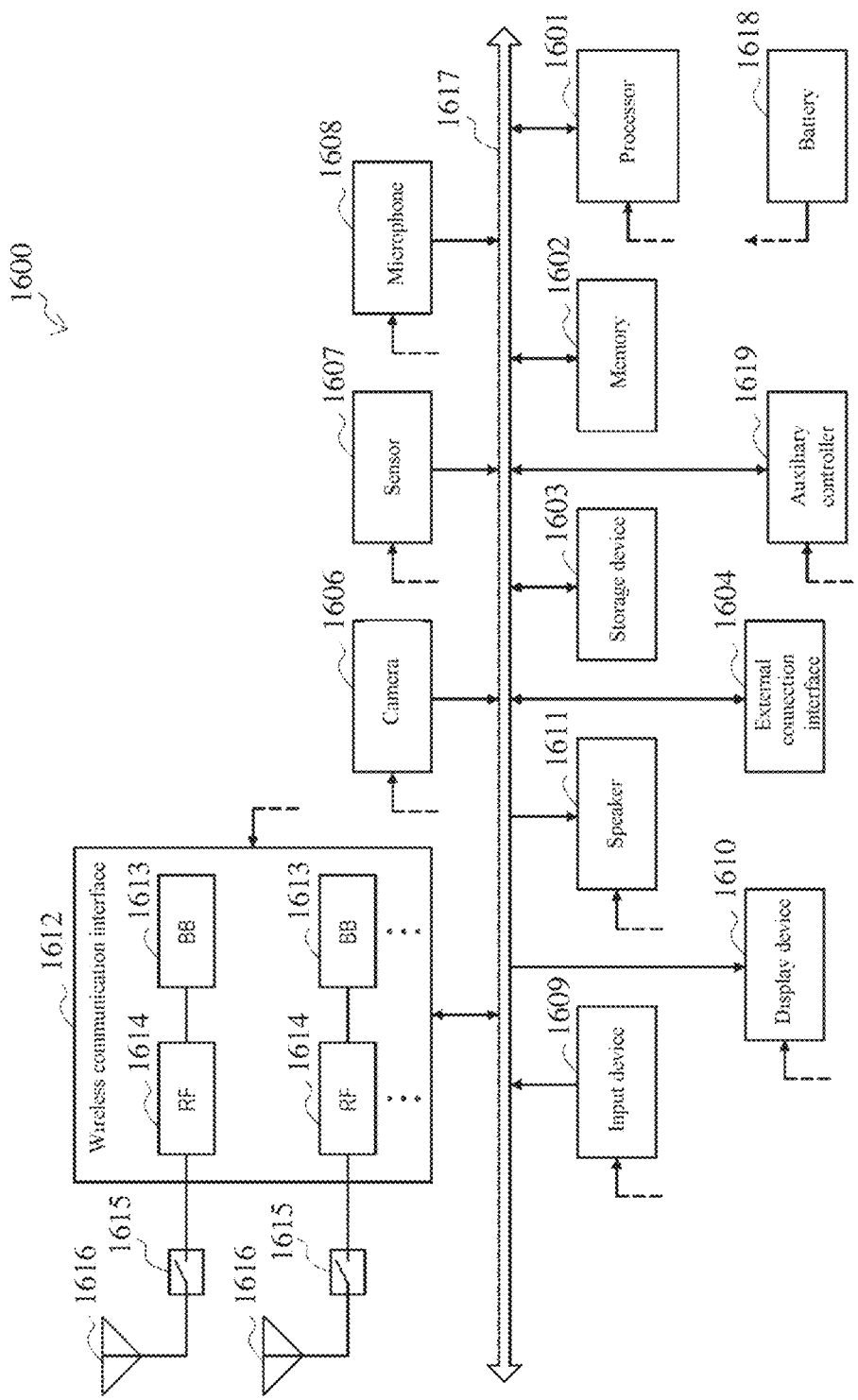
FIG. 16 is a block diagram showing an example of a schematic configuration of a smartphone.

FIG. 16 is a block diagram showing an example of a schematic configuration of a smartphone 1600 to which the technology of the present disclosure may be applied. The smartphone 1600 includes a processor 1601, a memory 1602, a storage device 1603, an external connection interface 1604, a camera 1606, a sensor 1607, a microphone 1608, an input device 1609, a display device 1610, a speaker 1611, a wireless communication interface 1612, one or more antenna switch 1615, one or more antenna 1616, a bus 1617, a battery 1618 and an auxiliary controller 1619.

The processor 1601 may be, for example, a CPU or a system on chip (SoC), and controls the functions of the application layer and another layer of the smartphone 1600. The memory 1602 includes a RAM and a ROM, and stores a program that is executed by the processor 1601, and data. The storage device 1603 may include a storage medium such as a semiconductor memory and a hard disk. The external connection interface 1604 is an interface via which an external apparatus (such as a memory card and a universal serial bus (USB) apparatus) is connected to the smartphone 1600.

The camera 1606 includes an image sensor (such as a charge coupled device (CCD) and a complementary metal oxide semiconductor (CMOS)) and generates a captured image. The sensor 1607 may include a group of sensors, such as a measurement sensor, a gyroscope sensor, a geomagnetic sensor and an acceleration sensor. The microphone 1608 converts sounds that are inputted to the smart phone 1600 into audio signals. The input device 1609 includes, for example, a touch sensor configured to detect touch onto a screen of the display device 1610, a keypad, a keyboard, a button, or a switch, and receives an operation or information inputted from a user. The display device 1610 includes a screen (such as a liquid crystal display (LCD) and an organic light-emitting diode (OLED) display), and displays an output image of the smartphone 1600. The speaker 1611 converts audio signals that are outputted from the smartphone 1600 to sounds.

The wireless communication interface 1612 supports any cellular communication scheme (such as LET and LTE-Advanced), and performs wireless communications. The wireless communication interface 1612 may generally include, for example, a BB processor 1613 and RF circuitry 1614. The BB processor 1613 may perform, for example, encoding/decoding, modulating/demodulating and multiplexing/de-multiplexing, and perform various types of signal processing for wireless communications. The RF circuitry 1614 may include a mixer, a filter and an amplifier for example, and transmits and receives a radio signal via the antenna 1616. The wireless communication interface 1612 may be a chip module on which the BB processor 1613 and the RF circuitry 1614 are integrated. As shown in FIG. 16, the wireless communication interface 1612 may include the multiple BB processors 1613 and the multiple RF circuitry 1614. Although FIG. 16 illustrates the example in which the wireless communication interface 1612 includes the multiple BB processors 1613 and the multiple RF circuitry 1614, the wireless communication interface 1612 may also include a single BB processor 1613 or single RF circuitry 1614.

Furthermore, in addition to the cellular communication scheme, the wireless communication interface 1612 may support another type of wireless communication scheme such as a short-distance wireless communication scheme, a near field communication scheme, and a wireless local area network (LAN) scheme. In this case, the wireless communication interface 1612 may include the BB processor 1613 and the RF circuitry 1614 for each wireless communication scheme.

Each of the antenna switches 1615 switches a connection destination of the antenna 1616 among multiple circuitry (such as circuitry for different wireless communication schemes) included in the wireless communication interface 1612.

Each of the antennas 1616 includes one antenna element or multiple antenna elements (such as multiple antenna elements included in the MIMO antenna), and is used for the wireless communication interface 1612 to transmit and receive a radio signal. The smartphone 1600 may include the multiple antennas 1616, as illustrated in FIG. 16. Although FIG. 16 illustrates the example in which the smartphone 1600 includes the multiple antennas 1616, the smart phone 1600 may also include a single antenna 1616.

Furthermore, the smartphone 1600 may include the antenna 1616 for each wireless communication scheme. In this case, the antenna switch 1615 may be removed from the configuration of the smartphone 1600.

The processor 1601, the memory 1602, the storage device 1603, the external connection interface 1604, the camera 1606, the sensor 1607, the microphone 1608, the input device 1609, the display device 1610, the speaker 1611, the wireless communication interface 1612, and the auxiliary controller 1619 are connected to each other via bus 1617. The battery 1618 supplies power to blocks in the smartphone 1600 shown in FIG. 16 via a feeder line which is indicated partially as a dashed line in the figure. The auxiliary controller 1619 operates a minimum necessary function of the smartphone 1600 in a sleeping mode, for example.

In the smartphone 1600 shown in FIG. 16, the sensing unit 210, the resource determination unit 220, the resource selection window determination unit 230, the sensing window determination unit 240, and the configuration parameter determination unit 260 described in FIG. 2 may be implemented by the processor 1401 or the auxiliary controller 1419. At least a portion of functions may be implemented by the processor 1601 and the auxiliary controller 1619. For example, the processor 1601 or the auxiliary controller 1619 may perform functions of sensing whether resources are idle, determining resources used for the HARQ transmission process, determining a size of a resource selection window, determining a size of a sensing window, and determining configuration parameters of a resource pool by executing instructions stored in the memory 1602 or the storage device 1603.

Second Application Example

Figure 17:
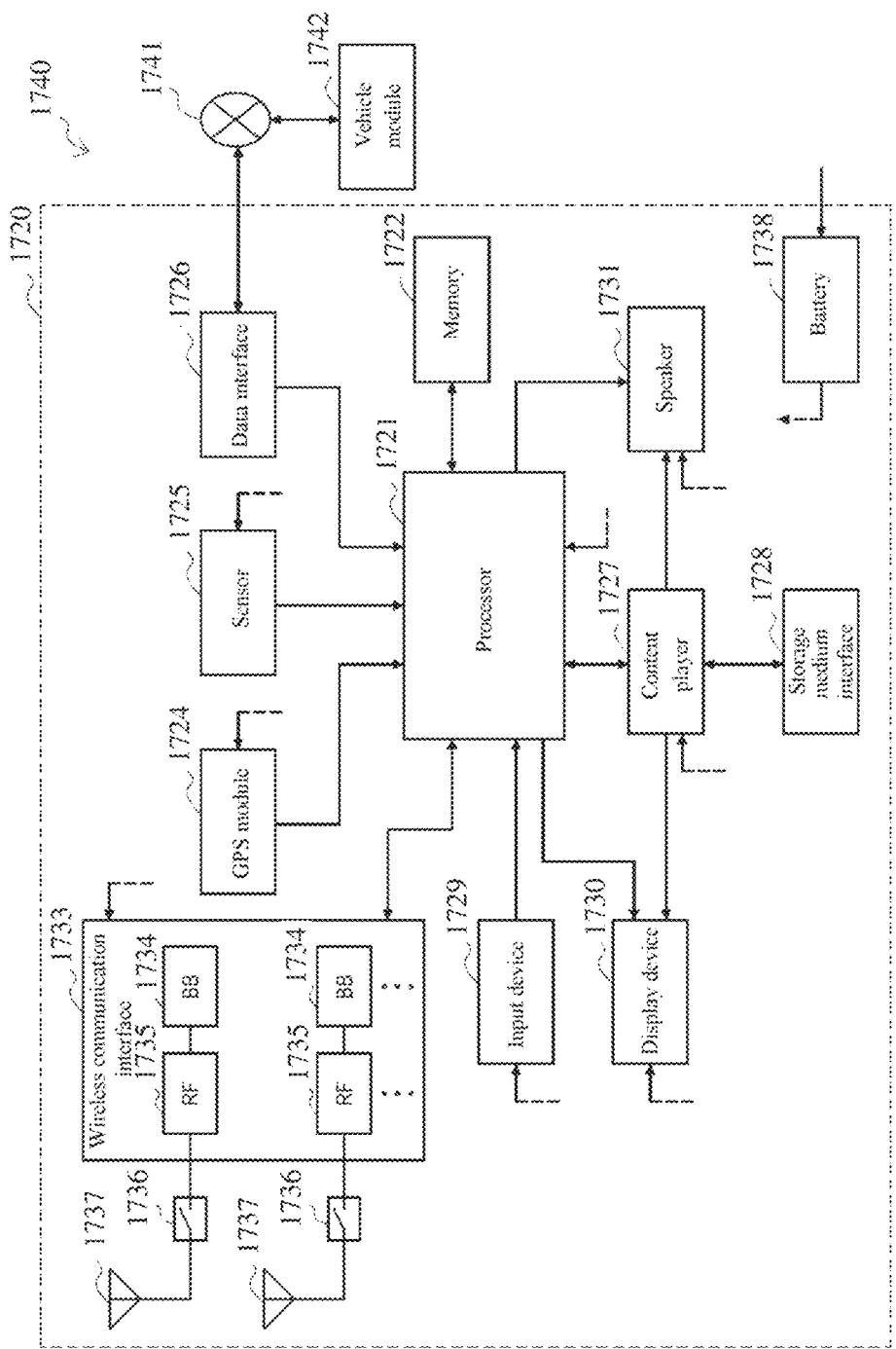
FIG. 17 is a block diagram showing an example of a schematic configuration of a vehicle navigation device.

FIG. 17 is a block diagram showing an example of a schematic configuration of a vehicle navigation device 1720 to which the technology according to the present disclosure may be applied. The vehicle navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, a wireless communication interface 1733, one or more antenna switches 1736, one or more antennas 1737 and a battery 1738.

The processor 1721 may be, for example, a CPU or an SoC, and controls a navigation function and additional function of the vehicle navigation device 1720. The memory 1722 includes a RAM and a ROM, and stores a program executed by the processor 1721, and data.

The GPS module 1724 measures a position (such as latitude, longitude and altitude) of the vehicle navigation device 1720 based on a GPS signal received from a GPS satellite. The sensor 1725 may include a group of sensors such as a gyroscope sensor, a geomagnetic sensor, and an air pressure sensor. The data interface 1726 is connected to, for example, a vehicle on-board network 1741 via a terminal not shown, and acquires data generated by the vehicle (such as vehicle speed data).

The content player 1727 reproduces content stored in a storage medium (such as a CD and a DVD) inserted into the storage medium interface 1728. The input device 1729 includes, for example, a touch sensor configured to detect touch on a screen of the display device 1730, a button, or a switch, and receives an operation or information inputted from a user. The display device 1730 includes a screen such as an LCD or an OLED display, and displays an image of the navigation function or content that is reproduced. The speaker 1731 outputs sound of the navigation function or the content that is reproduced.

The wireless communication interface 1733 supports any cellular communication scheme (such as LET and LTE-Advanced), and performs wireless communications. The wireless communication interface 1733 may generally include, for example, a BB processor 1734 and RF circuitry 1735. The BB processor 1734 may perform, for example, encoding/decoding, modulating/demodulating and multiplexing/de-multiplexing, and perform various types of signal processing for wireless communications. The RF circuitry 1735 may include a mixer, a filter and an amplifier for example, and transmits and receives a radio signal via the antenna 1737. The wireless communication interface 1733 may be a chip module on which the BB processor 1734 and the RF circuitry 1735 are integrated. As shown in FIG. 17, the wireless communication interface 1733 may include multiple BB processors 1734 and multiple RF circuitry 1735. Although FIG. 17 illustrates the example in which the wireless communication interface 1733 includes the multiple BB processors 1734 and the multiple RF circuitry 1735, the wireless communication interface 1733 may also include a single BB processor 1734 or single RF circuitry 1735.

Furthermore, in addition to the cellular communication scheme, the wireless communication interface 1733 may support another type of radio communication scheme such as a short-distance wireless communication scheme, a near field communication scheme, and a wireless LAN scheme. In this case, the wireless communication interface 1733 may include the BB processor 1734 and the RF circuitry 1735 for each wireless communication scheme.

Each of the antenna switches 1736 switches a connection destination of the antenna 1737 among multiple circuitry (such as circuitry for different wireless communication schemes) included in the wireless communication interface 1733.

Each of the antennas 1737 includes one antenna element or multiple antenna elements (such as multiple antenna elements included in the MIMO antenna), and is used for the wireless communication interface 1733 to transmit and receive a radio signal. The vehicle navigation device 1720 may include multiple antennas 1737, as shown in FIG. 17. Although FIG. 17 shows the example in which the vehicle navigation device 1720 includes the multiple antennas 1737, the vehicle navigation device 1720 may also include a single antenna 1737.

In addition, the vehicle navigation device 1720 may include an antenna 1737 for each wireless communication scheme. In this case, the antenna switch 1736 may be removed from the configuration of the vehicle navigation device 1720.

The battery 1738 supplies power to the blocks of the vehicle navigation device 1720 shown in FIG. 17 via a feeder line, which is partially shown with a dash line in FIG. 17. The battery 1738 accumulates power from the vehicle.

In the vehicle navigation device 1720 shown in FIG. 17, the sensing unit 210, the resource determination unit 220, the resource selection window determination unit 230, the sensing window determination unit 240, and the configuration parameter determination unit 260 described in FIG. 2 may be implemented by the processor 1721. At least a portion of functions may be implemented by the processor 1721. For example, the processor 1721 may perform functions of sensing whether resources are idle, determining resources used for the HARQ transmission process, determining a size of a resource selection window, determining a size of a sensing window, and determining configuration parameters of a resource pool by executing instructions stored in the memory 1722.

The technology of the present disclosure may also be implemented as a vehicle on-board system (or a vehicle) 1740 including one or more blocks of the vehicle navigation device 1720, the vehicle on-board network 1741 and a vehicle module 1742. The vehicle module 1742 generates vehicle data (such as vehicle speed, engine speed, and trouble information), and outputs the generated data to the vehicle on-board network 1741.

Preferred embodiments of the present disclosure have been described above with reference to the drawings. However, the present disclosure is not limited to the above examples. Those skilled in the art may make various changes and modifications within the scope of the appended claims, and it should be understood that such changes and modifications naturally fall within the technical scope of the present disclosure.

For example, a unit shown by a dotted line box in the functional block diagram in the drawings indicates that the functional unit is optional in the corresponding device, and the optional functional units may be combined appropriately to achieve desired functions.

For example, multiple functions implemented by one unit in the above embodiments may be implemented by separate apparatus. Alternatively, multiple functions implemented by respective units in the above embodiments may be implemented by separate apparatuses. In addition, one of the above functions may be implemented by multiple units. Such configurations are naturally included in the technical scope of the present disclosure.

In the specification, steps described in the flowchart include not only the processes performed chronologically as the described sequence, but also the processes performed in parallel or individually rather than chronologically. Furthermore, the steps performed chronologically may be performed in another sequence appropriately.

Embodiments of the present disclosure are described above in detail in conjunction with the drawings. However, it should be understood that the embodiments described above are intended to illustrate the present disclosure rather than limit the present disclosure. Those skilled in the art may make various modifications and alternations to the above embodiments without departing from the spirit and scope of the present disclosure. Therefore, the scope of the present disclosure is defined by the appended claims and equivalents thereof.

The invention claimed is:

1. An electronic device, comprising:
processing circuitry configured to:
sense, in first and second sensing windows that are discontinuous in a time domain, plural resources in either the first and second sensing windows that are idle, the plural resources that are sensed corresponding to a pool of resources for transmission and retransmission;
determine a plurality of resource selection windows that follow the first and second sensing windows and that are discontinuous in the time domain, each of the plurality of resource selection windows comprising the pool of resources for transmission and retransmission; and
perform a transmission process that includes an initial transmission and at least two retransmissions in one or more resource selection windows of the plurality of resource selection windows,
wherein the initial transmission and the at least two retransmissions are performed in resources in the one or more resource selection windows that correspond to resources that have been determined to be idle in both the first and second sensing windows,
wherein a total number of transmissions/retransmissions of the transmission process is K, where K is an integer≥3, and
wherein the processing circuitry is further configured to:
determine a resource selection window size that is applied to each of the plurality resource selection windows based on the total number K,
determine whether the resource selection window size exceeds a resource selection window size threshold and generate a determination result, and
control the transmission process that includes the initial transmission and the at least two retransmissions based on the determination result.

2. The electronic device according to claim 1, wherein the resource selection window size increases as the total number K increases.

3. The electronic device according to claim 1, wherein the processing circuitry is further configured to:
based on the resource selection window size that is determined based on the total number K, determine a sensing window size that is applied to the first and second sensing windows, such that the sensing window size is equal to or greater than the resource selection window size.

4. The electronic device according to claim 1,
wherein, upon the determination result indicating the resource selection window size does not exceed the resource selection window size threshold, all transmissions of the initial transmission and the at least two retransmissions are performed in resources that exist only in a first of the one or more resource selection windows, and
wherein, upon the determination result indicating that the resource selection window size does exceed the resource selection window size threshold, some transmissions of the initial transmission and the at least two retransmissions are performed in resources in the first resource selection window, and other transmissions of the initial transmission and the at least two retransmissions are performed in resources in a second resource selection window that follows the first resource selection window.

5. The electronic device according to claim 1,
wherein upon the determination result indicating that the resource selection window size does exceed the resource selection window size threshold, some transmissions of the initial transmission and the at least two retransmissions are performed in first resources existing in the one or more resource selection windows, and other transmissions of the initial transmission and the at least two retransmissions are performed in second resources existing in one or more resource random selection windows, and
wherein the one or more resource selection windows and the one or more resource random selection windows constitute corresponding subwindows, and the second resources are selected by the processing circuitry without first sensing whether the second resources are idle.

6. The electronic device according to claim 1, wherein, upon the determination result indicating that the resource selection window size does exceed the resource selection window size threshold the processing circuitry discards at least one of the at least two retransmissions.

7. A wireless communication method performed by an electronic device, the wireless communication method comprising:
sensing, in first and second sensing windows that are discontinuous in a time domain, plural resources in either the first and second sensing windows that are idle, the plural resources that are sensed corresponding to a pool of resources for transmission and retransmission;
determining a plurality of resource selection windows that follow the first and second sensing windows and that are discontinuous in the time domain, each of the plurality of resource selection windows comprising the pool of resources for transmission and retransmission; and
performing a transmission process that includes an initial transmission and at least two retransmissions in one or more resource selection windows of the plurality of resource selection windows,
wherein the initial transmission and the at least two retransmissions are performed in resources in the one or more resource selection windows that correspond to resources that have been determined to be idle in both the first and second sensing windows,
wherein a total number of transmissions/retransmissions of the transmission process is K, where K is an integer≥3, and
wherein the method further comprises:
determining a resource selection window size that is applied to each of the plurality resource selection windows based on the total number K;
determining whether the resource selection window size exceeds a resource selection window size threshold and generating a determination result; and
controlling the transmission process that includes the initial transmission and the at least two retransmissions based on the determination result.

8. The wireless communication method according to claim 7, wherein the resource selection window size increases as the total number K increases.

9. The wireless communication method according to claim 7, wherein the wireless communication method further comprises:
based on the resource selection window size that is determined based on the total number K, determining a sensing window size that is applied to the first and second sensing windows, such that the sensing window size is equal to or greater than the resource selection window size.

10. The wireless communication method according to claim 7,
wherein, upon the determination result indicating that the resource selection window size does not exceed the resource selection window size threshold, all transmissions of the initial transmission and the at least two retransmissions are performed in resources that exist only in a first of the one or more resource selection windows, and
wherein, upon the determination result indicating that the resource selection window size does exceed the resource selection window size threshold, some transmissions of the initial transmission and the at least two retransmissions are performed in resources in the first resource selection window, and other transmissions of the initial transmission and the at least two retransmissions are performed in resources in a second resource selection window that follows the first resource selection window.

11. The wireless communication method according to claim 7,
wherein, upon the determination result indicating that the resource selection window size does exceed the resource selection window size threshold, some transmissions of the initial transmission and the at least two retransmissions are performed in first resources existing in the one or more resource selection windows, and other transmissions of the initial transmission and the at least two retransmissions are performed in second resources existing in one or more resource random selection windows, and
wherein the one or more resource selection windows and the one or more resource random selection windows constitute corresponding subwindows, and the second resources are selected by the processing circuitry without first sensing whether the second resources are idle.

12. The wireless communication method according to claim 7, wherein, on the determination result indicating that the resource selection window size does exceed the resource selection window size threshold, the method further comprises discarding at least one of the at least two retransmissions.

13. A non-transitory computer-readable storage medium comprising executable computer instructions, wherein the executable computer instructions, when executed by a computer, cause the computer to perform the wireless communication method according to claim 7.

* * * * *